June 21, 1927.
J. H. HEYWOOD
1,633,378
LUBRICATING MEANS FOR INTERNAL COMBUSTION ENGINES
Filed Oct. 15, 1926
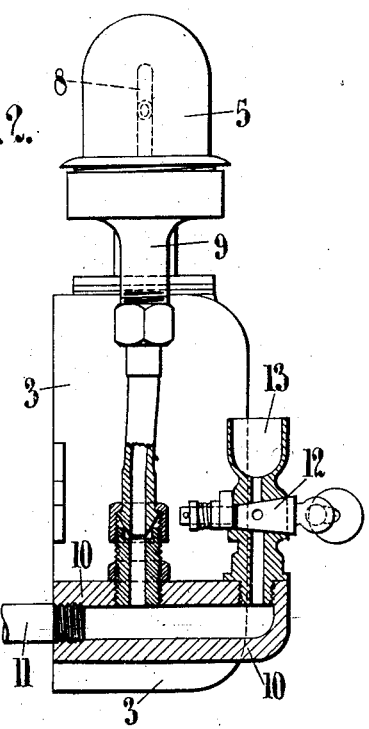
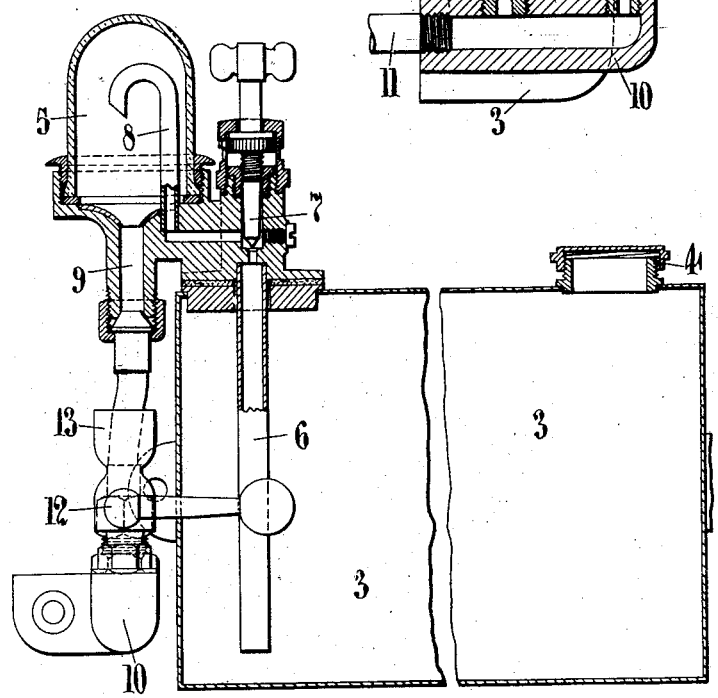
INVENTOR
James H. Heywood
BY
Stockbridge & Borst
ATTORNEYS Patented June 21, 1927.

1,633,378

UNITED STATES PATENT OFFICE.

JAMES HENRY HEYWOOD, OF RADCLIFFE, ENGLAND, ASSIGNOR TO CYLINDER TOP OILERS, LIMITED, OF LEEDS, ENGLAND

LUBRICATING MEANS FOR INTERNAL-COMBUSTION ENGINES.

Application filed October 15, 1926, Serial No. 141,797, and in Great Britain October 19, 1925.

This invention has reference to the lubrication of the cylinders of internal combustion engines, and has for its object to provide an improved means or apparatus for the admission with the fuel mixture or explosive charges into the cylinders of such engines, of regulated quantities of lubricant for lubricating the cylinders and the pistons operating therein, and extra air during running, and also for enabling a rich charge or mixture to be obtained for starting.

Apparatus in accordance with the invention comprises a lubricant-containing reservoir provided with an adjustable feed or delivery, a connection between said feed or delivery and the induction pipe or manifold of the engine, and an adjustable valve-controlled communication between said connection and the atmosphere, the arrangement being such that the suction of the engine draws a regulated supply of lubricant from the reservoir, and if desired, also a regulated supply of extra air, into the induction pipe or manifold with the fuel mixture or explosive charges. The connection aforesaid is also adapted for the admission of liquid fuel into the induction pipe or manifold to provide a rich mixture for starting.

In the accompanying drawings Fig. 1 is a sectional elevation of one embodiment of the invention, and Fig. 2 is an elevation partly in section looking towards the right hand in Fig. 1.

Referring to the drawing, the apparatus illustrated comprises an oil reservoir 3 which is filled through an aperture normally closed by a cap in which is provided a small vent opening 4. The reservoir is fitted with a sight drip feed lubricator 5 which may be of any appropriate kind. The inlet pipe 6 of the lubricator extends to almost the bottom of the reservoir 3 and at its upper end it is controlled by a needle valve 7 and communicates with the drip stand pipe 8. The delivery 9 of the lubricator is connected with a union 10 which is also connected with the induction pipe or manifold of the engine by means of a pipe 11.

The union 10 is also fitted with a plug cock 12 the casing of which is provided with a cup 13.

When the engine is running the suction of the engine draws oil from the reservoir 3 through the drip feed lubricator, the oil falling in drops from the stand pipe 8 and passing from the delivery 9 via the union 10 and pipe 11 to the induction pipe or manifold of the engine, when it passes with the mixture from the carbureter into the cylinders of the engine. The quantity of oil drawn into the cylinders of the engine may be regulated as required by means of the needle valve 7.

By opening the cock 12 additional air may be induced in regulated amount into the induction pipe or manifold to mix with the fuel mixture, while for the purpose of providing a rich mixture for starting fuel may be drawn into the induction pipe or manifold from the cup 13.

The pipe 11 will preferably be formed with a bend to prevent oil or fuel passing to the induction pipe or manifold except under the suction of the engine.

What I claim as my invention and desire to secure by Letters Patent is:—

1. Combined means for lubricating the cylinders of internal combustion engines and the admission of extra air during running, comprising a lubricant-containing reservoir provided with an adjustable drip feed or delivery connected with the induction pipe or manifold, said connection having a valve controlled communication with the atmosphere, whereby the suction of the engine is adapted to draw a regulated supply of lubricant and, if desired, also extra air into the cylinder or cylinders, substantially as herein set forth.

2. Lubricating means according to the preceding claim, characterized in that the connection between the feed or delivery from the reservoir and the induction of the engine also serves for the admission of fuel to provide a rich mixture for starting, substantially as herein set forth.

3. Lubricating means according to claim 2, comprising a lubricant-containing reservoir, an adjustable drip feed device having its inlet extending to almost the bottom of said reservoir and its delivery connected with a union which is also connected with the induction pipe or manifold of the engine, and a cock fitted to said union, substantially as set forth.

In witness whereof I have hereunto set my hand.

JAMES HENRY HEYWOOD.